May 16, 1944.  W. J. OLSON  2,348,840
MOLDING FLASK
Filed April 3, 1943  2 Sheets-Sheet 1
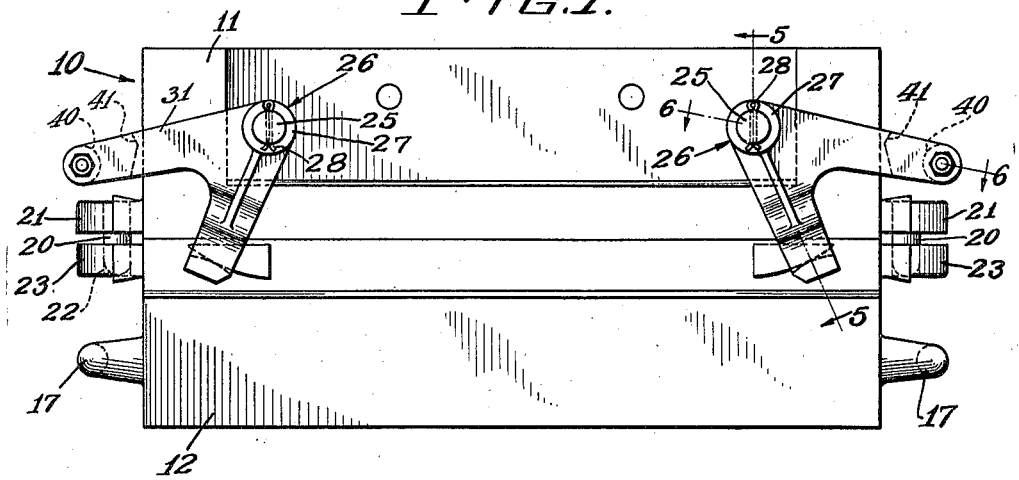
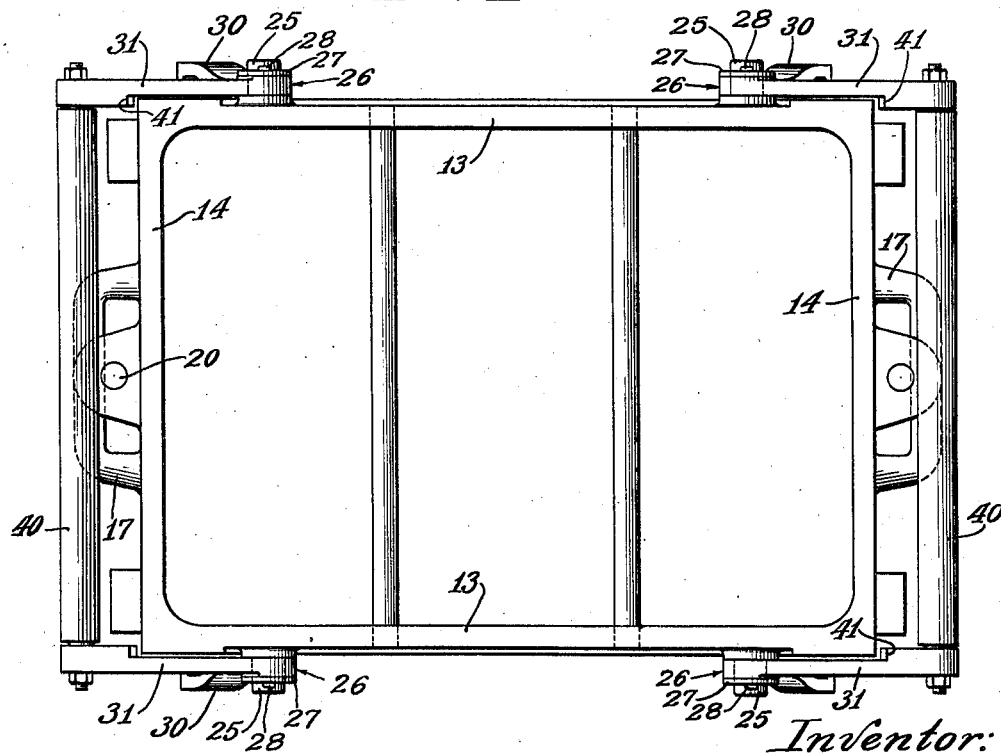
Inventor:
Walter J. Olson
By Wallace and Cannon
Attorneys May 16, 1944. W. J. OLSON 2,348,840
MOLDING FLASK
Filed April 3, 1943 2 Sheets-Sheet 2
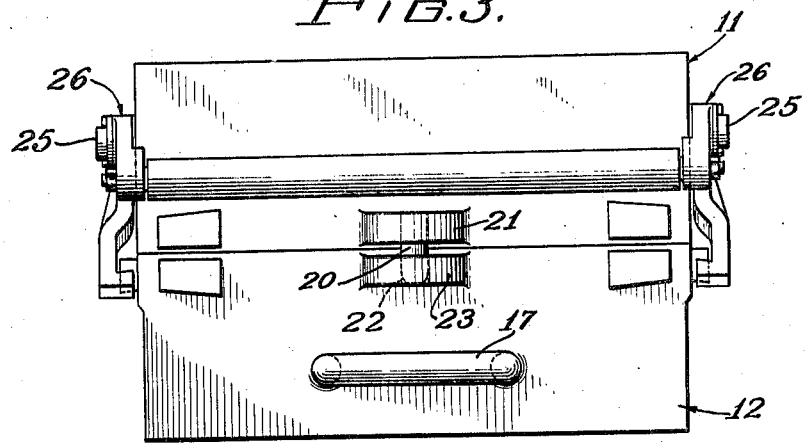
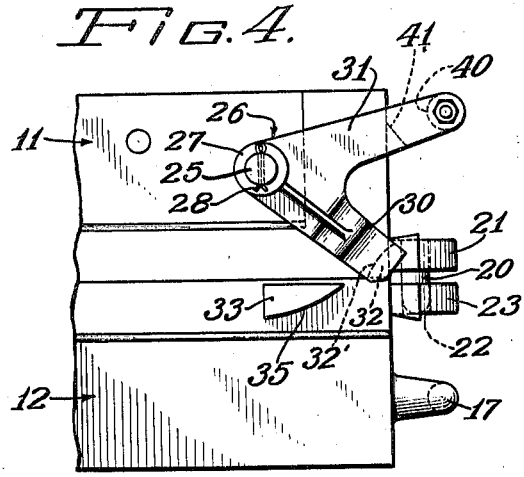
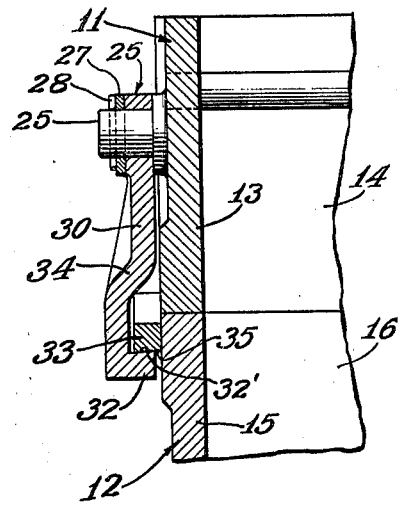
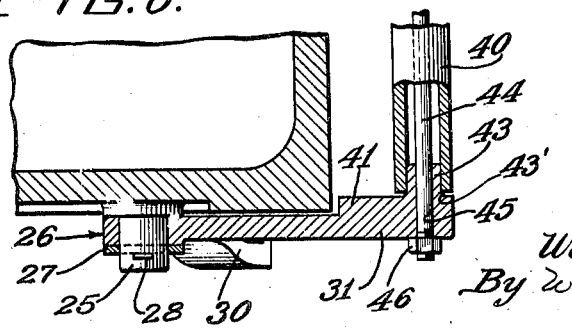
Inventor:
Walter J. Olson
By Wallace and Cannon
Attorneys Patented May 16, 1944

2,348,840

UNITED STATES PATENT OFFICE 2,348,840

MOLDING FLASK

Walter J. Olson, Suffern, N. Y., assignor to American Brake Shoe Company, a corporation of Delaware Application April 3, 1943, Serial No. 481,721

6 Claims. (Cl. 22—109)

This invention relates to molding flasks for use in metal foundries and the like, and it relates particularly to the clamping together of the separable elements of such flasks.

In connection with the transportation and use of molding flasks in foundries it is often desirable that the separable elements such as the cope and drag sections of such flasks be securely clamped together, and to enable this to be accomplished in a simple and expeditious manner is an important object of this invention.

A further object of the invention is to afford clamping means for molding flasks in such a manner that the operating means for the movable clamping elements serve as handles for lifting, transporting or manipulating the section of the mold upon which such movable clamping elements are mounted; and an object related to the foregoing is to afford clamping means and operating handles therefor on one of the separable elements of a molding flask and to so associate and relate the handles and the clamping means with each other and with the flask section upon which they are mounted that the required movements of the handles are coordinated with the shifting movements of the flask section required in the mold making operation to thereby enable the clamping and unclamping operations to be readily and easily performed.

Another object is to enable several clamping elements to be disposed at a plurality of spaced points about the sides of the flask to be conveniently operated, and a related object is to enable such clamping elements to be operated in pairs in such a manner that effective clamping of each clamping element may be readily attained.

Other and further objects of the present invention will be apparent from the following description and claims and are illustrated in the accompanying drawings which, by way of illustration, show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a side elevational view of a molding flask embodying the features of the invention;

Fig. 2 is a plan view of the flask;

Fig. 3 is an end view of the flask;

Fig. 4 is a fragmental side view of the flask showing the clamping means at one end in its released position; and Figs. 5 and 6 are sectional views taken along the lines 5—5 and 6—6 respectively of Fig. 1.

In the form chosen for disclosure herein the invention is embodied in a two-part flask 10 having matching cope and drag sections 11 and 12 respectively which in the present instance are rectangular in shape and are formed from cast iron. The cope 11 has side walls 13 and end walls 14 which are adapted respectively to rest upon the upper edges of similarly disposed side walls 15 and end walls 16 of the drag 12 to thereby afford the complete mold or flask 10. The end walls 16 of the drag 12 have stationary or fixed handles 17 formed thereon so that the drag 12 may be readily lifted and turned as required, and these handles serve, of course, for lifting of the entire flask 10 when this is required. The walls of the cope 11 and drag 12 are readily located in the desired aligned relation by cooperating means carried on the walls of the cope and drag respectively, and in the present case this is accomplished by downwardly extending aligning pins 20 mounted on lugs 21 projecting from the end walls 14 of the cope and adapted to be projected into complemental bores 22 formed in lugs 23 which project from the end walls 16 of the drag.

The construction of the flask 10 as thus described is conventional in character, and in accordance with the present invention means are provided on the two separable sections of the flask whereby these sections may be readily and easily clamped in assembled relation with the cope 11 held firmly and securely in place on the drag 12 in the transverse relation determined by the aligning pins 20. These clamping means as herein shown include cooperating clamping elements disposed adjacent to each corner of the flask, and provision is made for operation of such clamping elements in pairs. Thus, near each end of each side wall 13 of the cope 11 a pivot stud 25 is extended outwardly to receive and pivotally support a clamp member in the form of a bell crank 26. This arrangement affords four such bell cranks 26, one mounted adjacent to each corner of the cope 11, and each bell crank 26 is held in place on its mounting stud 25 by a washer 27 and a cotter pin 28, as shown in Figs. 5 and 6 of the drawings.

Each bell crank 26 includes a clamping arm 30 and an operating arm 31 and each clamping arm 30 has a clamping element in the form of a lug 32 extended inwardly from its inner surface in position to be engaged with a cooperating stationary clamping lug 33 formed on the outer surface of the adjacent side wall 15 of the drag. As shown in Fig. 5, each arm 30 is offset outwardly at 34 so as to clear the side of the related lug 33, and the lug 32 is formed so as to project inwardly from the outwardly offset end portion of the arm 30. Thus when an arm 30 is swung in a clamping direction, or clockwise as viewed in Fig. 4, the lug 32 of the arm 30 will be moved into position beneath the lower surface 35 of the related lug 33, thereby to prevent upward separating movement of the corner of cope upon which this clamping arm 30 is located.

The relationship of the two clamping lugs 32 and 33 is such that by application of clamping force to the clamping arm 30 in a clamping direction, a wedging action is attained between the two lugs 32 and 33 tending to draw the cope and drag into firmly clamped relation to each other, and by this arrangement wear upon the engaged surfaces of the lugs or other parts of the clamping means is taken up as an incident to each clamping operation. As herein shown this wedging action is attained by forming the surface 35 of each lug 33 eccentrically with respect to the axis of movement of the related clamping arm 30 so that after initial engagement of the lug 32 with the least eccentric portion of the surface 35, further clamping movement of the arm 30 moves the lug 32 along the surface 35 and into engagement with the more eccentric portions thereof. Such engagement of the two lugs is facilitated by rounding the upper or operative surface of the lug 32 as at 32', Fig. 4, and the two surfaces 32 and 35 are formed at an angle transversely as shown in Fig. 5 so that the engaged surfaces 32' and 35 cannot be disengaged by outward displacement of the lug 32 away from the wall 15 upon which the lug 33 is formed. In other words, the two lugs 32 and 33 are in effect undercut so as to prevent transverse disengagement thereof.

While the four clamping arms 30 might of course be actuated individually the present invention provides for actuation thereof in pairs so that by the use of both hands the workman may simultaneously impart clamping or unclamping movement to all of the clamping arms 30. In attaining this desirable mode of operation the clamping arms 30 at one end of the cope 11 are controlled by one handle 40 while the clamping arms 30 at the other end of the cope are actuated by a second handle 40 of similar form and construction. Each handle 40 is disposed between the operating arms 31 of the two clamping arms 30 which are to be operated thereby, and the arrangement is such that each handle 40 is disposed in generally parallel but spaced relation to the adjacent end wall 14 of the cope, thereby to locate the handles 40 in symmetrical relation to the cope 11 and enable the handles 40 to be readily grasped by the workman. Thus when the workman wishes to lift the cope 11, both handles 40 are grasped so as to rock the related bell cranks 26 upwardly about their axes 25, and such upward movement is limited by engagement of lugs 41 formed on the arms 31 with the outer surfaces of the adjacent end walls 14 of the cope. Thus the handles 40 move upwardly to what may be termed lifting or carrying positions, shown in Fig. 4, so that further upward movement of the handles 40 results in lifting of the cope 11.

In the event that the cope 11 has been located on a drag 12 in clamped relation thereto, such raising of the handles 40 serves, of course, to unclamp the cope 11, and it will be observed that the required upward movement of the handles 40 with respect to the cope 11 merely constitutes the beginning of the upward movement required to lift the cope 11 from the drag 12. Thus the unclamping operation and the cope-lifting operation are coordinated as a continuous upward movement which may be readily and easily performed by the workman.

The arrangement of the handles 40 so as to have a predetermined lifting position, as thus described, also simplifies and facilitates the positioning of the cope 11 on the drag 12 as well as the clamping of the cope to the drag, for as will be evident in Fig. 4 of the drawings, the lifting of the cope 11 by the handles 40 locates all of the clamping arms 30 in their inactive positions so that the cope 11 may be lowered onto the top of the drag 12 without interference of lugs 32 with the lugs 33. In such mounting of the cope 11 on the drag 12 the aligning pins 20 serve to properly locate the cope with relation to the drag, and this serves of course to locate all of the clamping arms 30 in such positions that the lugs 32 thereof may be engaged with the related lugs 33 of the drag merely by downward pivotal movement of the arms 30 from the position Fig. 4 to the position of Fig. 1. Such downward pivoting or clamping movement of the arms 30 is accomplished by downward shifting movement of the handles 40 from the lifting positions, Fig. 4, to their clamping positions of Fig. 1, and it will be observed that such movement constitutes merely a continuation of the downward lowering movement required in lowering the cope 11 into position on the top of the drag 12. Thus the movements required on the part of the workman are so coordinated as to simplify and facilitate the use of the present flask 10.

In order that the proper relationship between the cope 11 and the drag 12 may be assured in each instance it is desirable that each of the clamping lugs 32 be firmly engaged with its related lug 33, and to assure this result the handles 40 are so connected and related to the operating arms 31 that each handle 40 acts as an equalizing bar between the two arms 31 with which it is associated. Thus each handle 40, as herein shown, is in the form of a tube, as best shown in Fig. 6, and the ends of the tube are disposed in embracing relation to positioning studs 43 formed on the adjacent sides of the arms 31. The studs 43 are held in position within the ends of the tube by a rod 44 which extends through the tube and through bores 45 formed through the studs 43 and the arms 31. The tubes which form the handles 40 fit relatively loosely on the studs 43 so as to permit some shifting movement in a lateral or rocking sense, but such shifting movement is limited by the action of retaining nuts 46 threaded on the ends of the rods 44 and engaging the outer faces of the arms 31. The studs 43 are filletted as at 43' to the arm 31 so as to space the ends of each tube from the adjacent flat faces of the arms 31, as shown in Fig. 6, and hence the tube which forms the handle 40 may move with a slight pivotal or universal action with respect to the associated arms 31. With this construction it will be clear that when downward clamping force is applied to the handle 40 near the midpoint thereof, the clamping arms 30 will be moved in unison toward the stationary clamping lugs 33, and in the event that one of the lugs 32 becomes firmly engaged with its lug 33 prior to the firm engagement of the other two lugs 32 and 33, the handle 40 becomes operative as an equalizing bar to continue movement of the other lug 32 until firm engagement thereof with its stationary lug 33 terminates movement of the handle 40.

From the foregoing description it will be evident that the present invention enables separable sections of a molding flask to be firmly clamped together by means which are coordinated with the usual and required movements of the upper section in such a manner that the clamping and unclamping operations may be performed without loss of time. Thus the normal procedure of the operator or workman may be retained while assuring firm clamping of the mold or flask sections. It will also be apparent that the clamping means afforded by the present invention assures film clamping of the two separable flask sections at a plurality of points about the walls thereof, and this is attained even though there may be slight irregularities of the several clamping elements due to wear or other causes.

Hence, while I have illustrated and described the preferred embodiment of my invention, it is to be understood that it is capable of variation and modification and I therefore do not wish to be limited to the precise details set forth, but desire to avail myself of such changes and alterations as fall within the purview of the following claims:

I claim:

1. In a molding flask, a pair of separably related flask sections each having side and end walls, one of said sections having bearing means extended outwardly from both of its side walls adjacent to each end thereof, a pair of clamping arms mounted adjacent each end of said one section, one clamping arm being mounted on said bearing means outside of the respective side walls and adjacent to each corner of said one section, interengageable clamping lugs on the respective clamping arms and on the other of said sections, said clamping arms at each end having operating arms connected thereto and extended beyond the adjacent ends of said one section, handles extended along opposite ends of said one section and connecting the operating arms at each of the ends of said one section for operating the clamping arms in pairs, and stop means operating between said operating arms and the end walls of said one of said sections to limit upon pivoting movement of said operating arms and the handles carried thereby.

2. In a molding flask, a pair of separably related flask sections each having side and end walls, one of said sections having bearing means extended outwardly from both of its side walls adjacent to each end thereof, a pair of bell cranks mounted adjacent each end of said one section, one bell crank being mounted on said bearing means outside of the respective side walls and adjacent to each corner of said one section, each of said bell cranks having a clamping arm and an operating arm, interengageable clamping lugs on the respective clamping arms and on the other of said sections, said operating arms being extended beyond the adjacent ends of said one section, handles extended along opposite ends of said one section and connected to the operating arms at each of the ends of said one section for slight universal movement relative thereto to operate the clamping arms in pairs with an equalizing action, and stop means acting between said operating arms and the end walls of said one of said sections to limit upward pivoting movement of said operating arms and thereby afford upper carrying positions for said handles.

3. In a molding flask, a pair of separably related flask sections each having side and end walls, one of said sections having bearing means extended outwardly from both of its side walls adjacent to each end thereof, a pair of clamping arms mounted adjacent each end of said one section, one clamping arm being mounted on said bearing means outside of the respective side walls and adjacent to each corner of said one section, means affording interengageable clamping surfaces on the respective clamping arms and on the other of said sections and so disposed as to enable clamping engagement of such clamping surfaces upon rocking movement of the respective clamping arms on their supporting bearing means, said clamping arms at each end having operating arms connected thereto and extended beyond the adjacent ends of said one section, handles extended along opposite ends of said one section and connecting the operating arms at each of the ends of said one section for operating the clamping arms in pairs, and stop means operating between said operating arms and the end walls of said one of said sections to limit upward pivoting movement of said operating arms and the handles carried thereby.

4. In a molding flask, a pair of separably related flask sections each having side and end walls, one of said sections having bearing means extended outwardly from both of its side walls adjacent to each end thereof, a pair of bell cranks mounted adjacent each end of said one section, one bell crank being mounted on said bearing means outside of the respective side walls and adjacent to each corner of said one section, each of said bell cranks having a clamping arm and an operating arm, means affording interengageable clamping surfaces on the respective clamping arms and on the other of said sections, said operating arms being extended beyond the adjacent ends of said one section, and handles extended along opposite ends of said one section and connected to the operating arms at each of the ends of said one section for slight universal movement relative thereto to operate the clamping arms in pairs with an equalizing action.

5. In a molding flask, a pair of separably related flask sections each having side and end walls, one of said sections having bearing means extended outwardly from both of its side walls adjacent to each end thereof, a pair of bell cranks mounted adjacent each end of said one section, one bell crank being mounted on said bearing means outside of the respective side walls and adjacent to each corner of said one section, each of said bell cranks having a clamping arm and an operating arm, means affording interengageable clamping surfaces on the respective clamping arms and on the other of said sections, said operating arms being extended beyond the adjacent ends of said one section, handles extended along opposite ends of said one section and connected to the operating arms at each of the ends of said one section for slight universal movement relative thereto to operate the clamping arms in pairs with an equalizing action, and stop means acting between said operating arms and the end walls of said one of said sections to limit upward pivoting movement of said operating arms and thereby afford upper carrying positions for said handles.

6. In a molding flask, a pair of separably related flask sections each having side and end walls, two pairs of bell cranks, one mounted adjacent to each end section, the ball cranks of each pair being mounted on a common axis and the mounting axes of the two pairs of bell cranks being parallel to each other and substantially parallel to the upper edges of the end walls of said one flask section, each of said bell cranks having a clamping arm and an operating arm, means affording interengageable clamping surfaces on the respective clamping arms and on the other of said flask sections, handles extended along opposite ends of said one flask section and connected respectively to the operating arms of the bell cranks at the respective ends of said one section for slight universal movement relative to the operating arms to thereby operate said clamping arms in pairs with an equalizing action, and stop means acting between said bell cranks and selected of the walls of said one of said sections to limit upward pivoting movement of said operating arms and thereby afford upper carrying positions for said handles.

WALTER J. OLSON.